United States Patent [19]

Erickson et al.

[11] Patent Number: 4,885,148

[45] Date of Patent: Dec. 5, 1989

[54] PRODUCTION OF MONOBASIC POTASSIUM PHOSPHATE WITH LOW CHLORIDE CONTENT FROM POTASSIUM CHLORIDE AND PHOSPHORIC ACID PRODUCED FROM THE COMMERCIAL WET PROCESS

[75] Inventors: William R. Erickson; Donald B. Stain; James D. Wilson, all of Lakeland, Fla.

[73] Assignee: Phosphate Engineering & Construction Co., Inc., Lakeland, Fla.

[21] Appl. No.: 240,609

[22] Filed: Sep. 6, 1988

[51] Int. Cl.$^4$ .................. C01B 15/16; C01B 25/26
[52] U.S. Cl. ................................ 423/309; 423/307; 423/308; 71/34
[58] Field of Search ................ 423/307, 308, 309; 71/34

[56] References Cited

U.S. PATENT DOCUMENTS

| | | | |
|---|---|---|---|
| 1,456,850 | 5/1923 | Hazen et al. | 423/306 |
| 3,547,615 | 12/1970 | Beckham | 71/34 |
| 3,554,729 | 1/1971 | Curless | 71/34 |
| 3,767,770 | 10/1973 | Worthington et al. | 71/34 |
| 3,784,367 | 1/1974 | Moore | 71/34 |
| 4,158,558 | 6/1979 | Thompson et al. | 71/34 |

*Primary Examiner*—Gregory A. Heller
*Attorney, Agent, or Firm*—Dowell & Dowell

[57] ABSTRACT

Relatively pure monopotassium phosphate is produced from wet process phosphoric acid in a process wherein the phosphoric acid is mixed with potassium chloride and recycled components from downstream product and by-product recovery steps and heated to permit hydrogen and chloride to evolve from the melt as gases and wherein the melt is subsequently treated so as to remove impurities so that the monopotassium phosphate may be recovered as a relatively pure crystalline product with low chloride content.

19 Claims, 3 Drawing Sheets

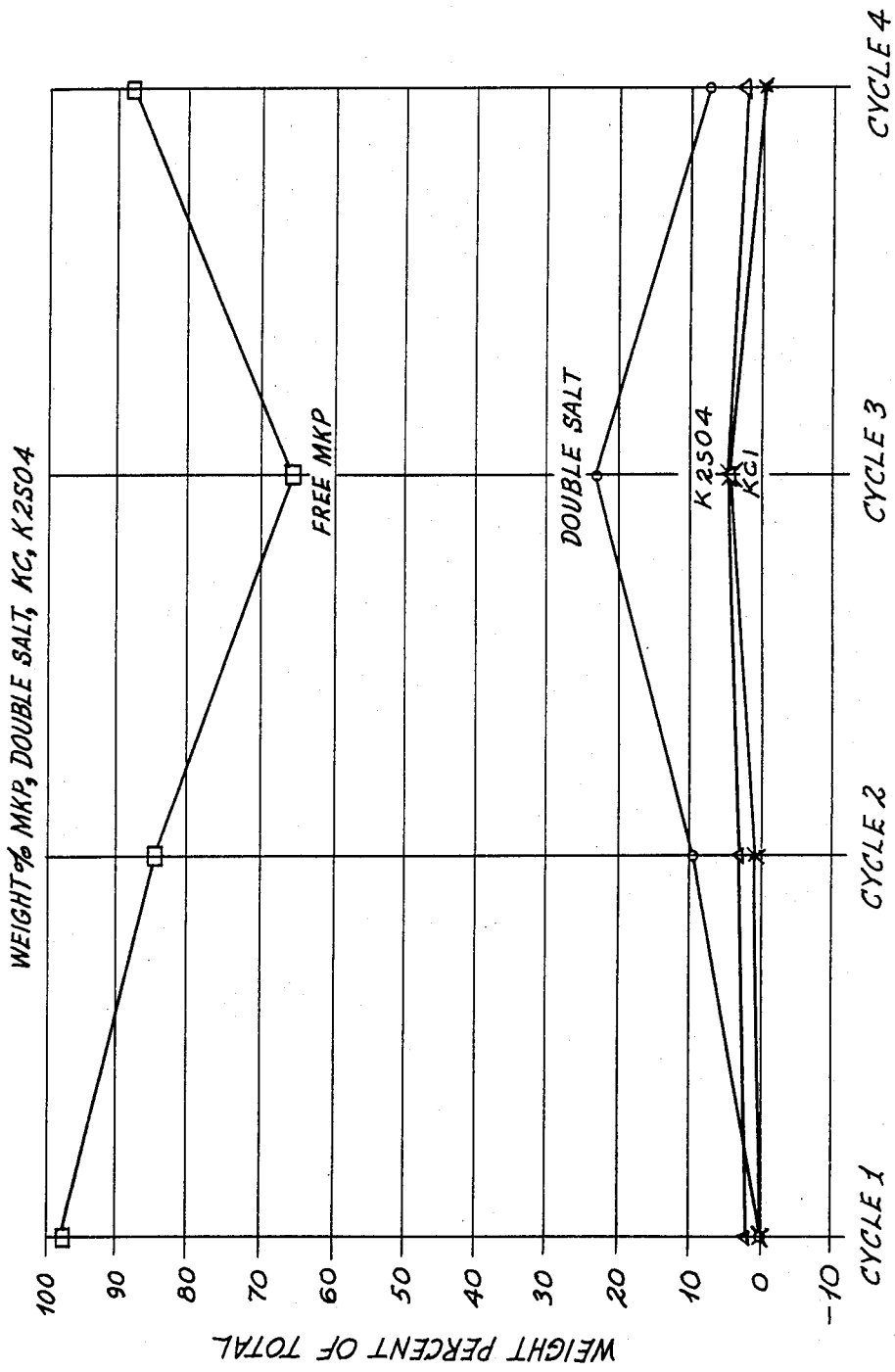

PRODUCTION OF MONOBASIC POTASSIUM PHOSPHATE WITH LOW CHLORIDE CONTENT FROM POTASSIUM CHLORIDE AND PHOSPHORIC ACID PRODUCED FROM THE COMMERCIAL WET PROCESS

BACKGROUND OF THE INVENTION

1. Field of the Invention

This invention is generally directed to the production of monopotassium phosphate from commercial wet process phosphoric acid and more specifically to a method of producing a relatively pure low chloride content monopotassium phosphate by a process wherein the wet process phosphoric acid is mixed with potassium chloride and heated to form a melt from which metallic impurities may be recovered by settling, filtration, centrifugation and other by-product recovery techniques. In some instances where double salts of phosphorous are present in the recovered by-products, such by-products are recycled back to the acid melt. The filtrate remaining after the impurities are removed is further processed to separate the monopotassium phosphate from the mother liquor. The separation of the monopotassium phosphate may be accomplished in several manners including evaporative or cooling crystallization in a single or plural stages wherein the crystalline monopotassium phosphate is separated in the first stage and, if desired, potassium sulfate and other by-products recovered in subsequent stages. The wash liquors from the crystalline steps may be returned to the monopotassium phosphate melt.

Utilizing the process of the present invention, relatively pure monopotassium phosphate may be obtained having chloride levels as low as 0.1%.

2. History of the Related Art

There have been many processes proposed to produce monopotassium phosphate by a direct reaction of commercial wet process phosphoric acid and potassium chloride An important factor in most processes for producing monopotassium phosphate is to obtain a product having a low content of chloride However, many problems have been encountered when using commercial wet process phosphoric acid as an initial acid source.

In most prior art processes, the desired degree of chloride reduction was accomplished by driving chlorides off as gases to form hydrochloric acid (HCL) with the initial melt of wet process phosphoric acid and potassium chloride being maintained at high temperatures for long periods of time. Such processes have hertofore not been completely successful or satisfactory due to the creation of insoluble polyphosphates. To avoid this loss of phosphates, some processes have attempted to achieve the desired reduction in chloride levels at reduced temperatures and retention times. Other processes have sought to prevent the formation of precipitates from the impurities which are in the feed acid.

In the wet process formation of phosphoric acid, phosphate rock is reacted with phosphoric acid and sulfuric acid. As there are many impurities in the rock, such impurities are also contained in the wet process phosphoric acid. These impurities not only include various organic materials but various metal and other elements including iron, aluminum, magnesium, potassium, cadmium, fluorine, calcium and sodium. These impurities present unique problems in the processing of wet process phosphoric acid with potassium chloride in order to obtain relatively pure monopotassium phosphate products.

In U.S. Pat. No. 3,554,729 to Curless, a process for producing low chloride potassium phosphate fertilizers from wet process phosphoric acids is disclosed wherein the phosphoric acids are mixed with potassium chloride and minor amounts of sulfuric acid. The mixture is heated between 70° C. and 200° C. and the chlorides are recovered as hydrochloric acid from the melt by passing a stream of non-reactive gas or steam therethrough while maintaining the melt in an atmosphere of reduced pressure. In this manner, a resultant potassium acid phosphate is obtained which may be formulated into concentrated fertilizers having not more than 2% chloride. Although the process utilizes low temperatures, the method is directed to substantially eliminating chlorides by gas sparging at reduced pressures. Further, there is no attempt to create a relatively pure monopotassium phosphate by removing the impurities from the melt.

In U.S. Pat. No. 1,456,850 to Hazen et al., a process for preparing a monoammonium and monopotassium phosphate fertilizer in which the ratio of nitrogen (N), phosphoric acid ($P_2O_5$) and potash ($K_2O$) are approximately 2-10-4 is presented. In this process, concentrated phosphoric acid (70 to 90 percent) is mixed with potassium chloride and heated to approximately 200° C. Hot air is blown through the melt to accelerate the removal of chlorides from solution. Thereafter, a gaseous ammonia is added to neutralize the acids in the melt. The material in solution is centrifuged so as to remove precipitates of phosphates of potassium and ammonium. Due to the high concentration of the phosphoric acid, there are fewer impurities in the melt. Also, there is no attempt to deal with potential impurities as the ammonia is added to neutralize acids and recover the phosphate and potassium directly from the melt. A similar process for treating a melt of concentrated phosphoric acid and potassium chloride is disclosed by the same inventors in U.S. Pat. No. 1,456,831.

The use of an ammonia to neutralize acids in the production of fertilizers from wet process phosphoric acid mixed with potassium chloride is widely recognized. Other patents involving this general technology include U.S. Pat. No. 3,388,966 to MacDonald wherein monoammonium phosphate and diammonium phosphate are produced and U.S. Pat. No. 3,726,660 to Drechsel et al. wherein nitric acid is used to process phosphate rock to form a mixture which is reacted with potassium chloride and sulfuric acid. Upon removal of calcium sulfate precipitate, the resulting filtrate is contacted with ammonia to form a concentrated aqueous nitrophosphate fertilizer. Also, in U.S. Pat. No. 4,158,558 to Thompson et al., wet process phosphoric acid and potassium chloride are mixed, heated and sparged with steam in a multi-step process to recover hydrochloric acid and thereafter ammonia is added to maintain a desired pH level. The product stream is subsequently cooled and filtered to obtain a potassium polyphosphate liquid fertilizer.

In U.S. Pat. No. 3,547,615 to Beckham, potassium phosphate fertilizer solutions are produced by reacting potassium chloride with 80% furnace grade phosphoric acid in the presence of steam in order to recover hydrochloric acid. The effluent is diluted, and thereafter introduced into a crystallizer-cooler to precipitate monopotassium phosphate. The monpotassium phosphate is subsequently treated with ammonia to form several liquid phases which are separated to obtain a heavy liquid phase tri-potassium phosphate product stream. Such a process, however, is not functional if the initial reactants were to include commercial grade wet process phosphoric acid.

Other prior art patents of interest include U.S. Pat. Nos. 3,767,770 to Worthington, 3,607,213 to Jerzy et al., 3,784,367 to Moore and Re. 29,450 to Drechsel et al.

The process which is the subject of the present invention allows the production of a low chloride product under milder conditions in the reaction system and provides for removal of the impurities introduced with the phosphoric acid, which allows a high quality crystal form of monopotassium phosphate to be recovered. It was discovered that the impurities in the melt was the reason crystallization of the monopotassium phosphate could not be achieved in prior processes utilizing wet process phosphoric acids. Prior treatment of the wet process acid for removal of organics is also not required, unless recovery of a high quality hydrochloric acid by-product is desirable. Even then, prior treatment of the acid may not be required, since the hydrochloric acid can be recovered in stages. Additionally, it is possible to treat the hydrochloric acid solution directly to remove the organics.

SUMMARY OF THE INVENTION

This invention is directed to a method for treating wet process phosphoric acid, merchant grade acid, clarified 52-54% acid or superacid and the like, with potassium chloride so as to obtain a relatively pure monobasic potassium phosphate product having low chloride content. In the process, wet process phosphoric acid is mixed with potassium chloride and heated for a sufficient time and under conditions within a reactor which allow evolution of hydrogen chloride from the melt as a gas. In order to optimize the recovery of raw materials from the process, recycled components from the product recovery steps of the present invention are added to the reactor and mixed with the potassium chloride and wet process phosphoric acid. The resulting melt from the reactor is dissolved in water in a dissolution step so as to form a slurry having insoluble compounds therein which insoluble compounds are formed as a result of metallic and other impurities contained in the wet process acid. The insoluble compounds or components are separated from solution by suitable means such as filters, centrifuges or settling tanks. A portion of the solids may be recycled back to the initial reactor. The remaining portion or the entire portion of the insoluble solids may be further washed and recovered as a potential by-product for future use. The wash waters utilized to process the insoluble solids may be recycled to the dissolution step.

Following the removal of the insoluble impurities, a filtrate is left which is free from impurities and which contains the desired monopotassium (MKP) product plus unreacted potassium chloride and unreacted phosphoric acid.

Depending upon the free sulfate content of the phosphate acid, there may be a certain amount of potassium sulfate. In some instances, it may also be possible for the resultant filtrate or solution to contain a certain amount of double salt $H_3PO_4 \cdot KH_2PO_4$. The filtered pregnant mother liquor is fed from the dissolution tank or from a settling tank disposed downstream thereof to a product recovery section which may include either an evaporative crystallization unit or a crystallization cooler wherein the monopotassium phosphate is separated from the mother liquor either as a pure product or with some amount of potassium sulfate incorporated therewith. When a cooled crystallizer unit is incorporated in the process of the present invention, the slurry of mother liquor and precipitated product is circulated therein while the temperature is maintained to a point just above the temperature at which subsequent products would be caused to be precipitated out of solution but at which the product (MKP) is precipitated.

In those instances where it is desired to separate additional products, secondary crystallization stages may be incorporated within the process of the present invention. When a second crystallization stage is incorporated, potassium sulfate may be obtained from the solution. Where it is not required to obtain a pure monopotassium phosphate, then both the monopotassium phosphate and the potassium sulfate may be removed by adjusting the temperature in the initial crystallization stage. As an alternative, when pure monopotassium phosphate is desired, a purge stream may be utilized to control the potassium sulfate level in the system.

As a further embodiment of the present invention, a third crystallization stage may be incorporated wherein any remaining monopotassium phosphate, potassium sulfate, potassium chloride and double salts may be removed and recycled back to the initial reactor. Any remaining unreacted phosphoric acid may either be withdrawn or purged from the system or may be treated and neutralized with ammonia to form a usable N-P-K fertilizer. As a preferred method, the concentration of acid from the third crystallization stage may be allowed to build up in the recycled water stream which is returned to the initial reactor and by bleeding a portion of the stream so as to balance the amount of unreacted phosphoric acid which is returned to the original melt dissolution step from the reactor.

Slurries obtained from the product precipitation stage are separated by conventional separation devices such as filters or centrifuges so as to obtain wet product solids which may thereafter be dried and packaged or otherwise processed for future use.

It is the primary purpose of the present invention to provide a process for treating wet process phosphoric acid of a commercial grade with potassium chloride in a system which allows the recovery of relatively pure monopotassium phosphate crystals which are not limited in their use to fertilizer applications due to their relative purity.

It is yet another object of the present invention to provide a process for treating we process phosphoric acid with potassium chloride in a batch or continuous flow process and where impurities are removed as insoluble components immediately following the heating of the slurry to remove hydrochloric acid so that the filtrate stream can be further processed to recover monopotassium phosphate alone or in combination with potassium sulfates in one or more product separation stages.

It is yet another object of the present invention to overcome prior art difficulties in processing wet process phosphoric acid in order to obtain relatively pure monopotassium phosphate which is relatively free of residual chloride and may exhibit chloride levels as low as 0.1% from the solution.

It is yet a further object of the present invention to provide a method of producing monopotassium phosphate having low chloride contents from potassium chloride and phosphoric acid produced from a commercial wet process wherein the reaction conditions do not have to be as severe with respect to temperature and holding times as in prior art processes nor is the process required to utilize excesses of phosphoric acid in order to drive the reaction to completion relative to potassium chloride.

BRIEF DESCRIPTION OF THE DRAWINGS

FIG. 3 is a chart of the results of the cycle test of Example 3.

DESCRIPTION OF THE PREFERRED EMBODIMENT

The subject of the invention described herein is a process for the production of a crystalline monopotassium phosphate product (MKP) from potassium chloride (KCl) and wet process phosphoric acid. The invention differs from other processes in that the impurities brought in with the phosphoric acid are removed from the system as a waste material with potential uses such as fertilizers. This allows the product MKP to be removed as a higher purity crystalline product through crystallization processes. The use of crystallization processes makes it possible to manage the quality of the product recovered and to recycle the unreacted raw materials and unrecovered product to the initial reaction phase of the process. Thus, it is possible to produce a low chloride product MKP with a thorough utilization of the raw materials introduced into the process.

Depending on the nature of the by-product solids derived from the original melt dissolution step, the quality of the MKP product desired, the impurities in the wet process acid and the cost of the utilities available for any particular installation, the actual process of the present invention can take various forms. Generally, it is necessary that the process include steps which will achieve the steps of reacting clarified wet process phosphoric acid with potassium chloride, dissolving the resulting melt, removing precipitated impurities which are originally brought in with the wet process phosphoric acid, recovering MKP product, with or without potassium sulfate, and recovering materials not removed in the product streams for recycle to the initial reaction stage. If the wet process phosphoric acid has free sulfate, the resulting potassium sulfate must be removed from the process either as part of the MKP product stream or as a separate stream containing some MKP and possibly other compounds in order to form a balanced process.

Figure 1:
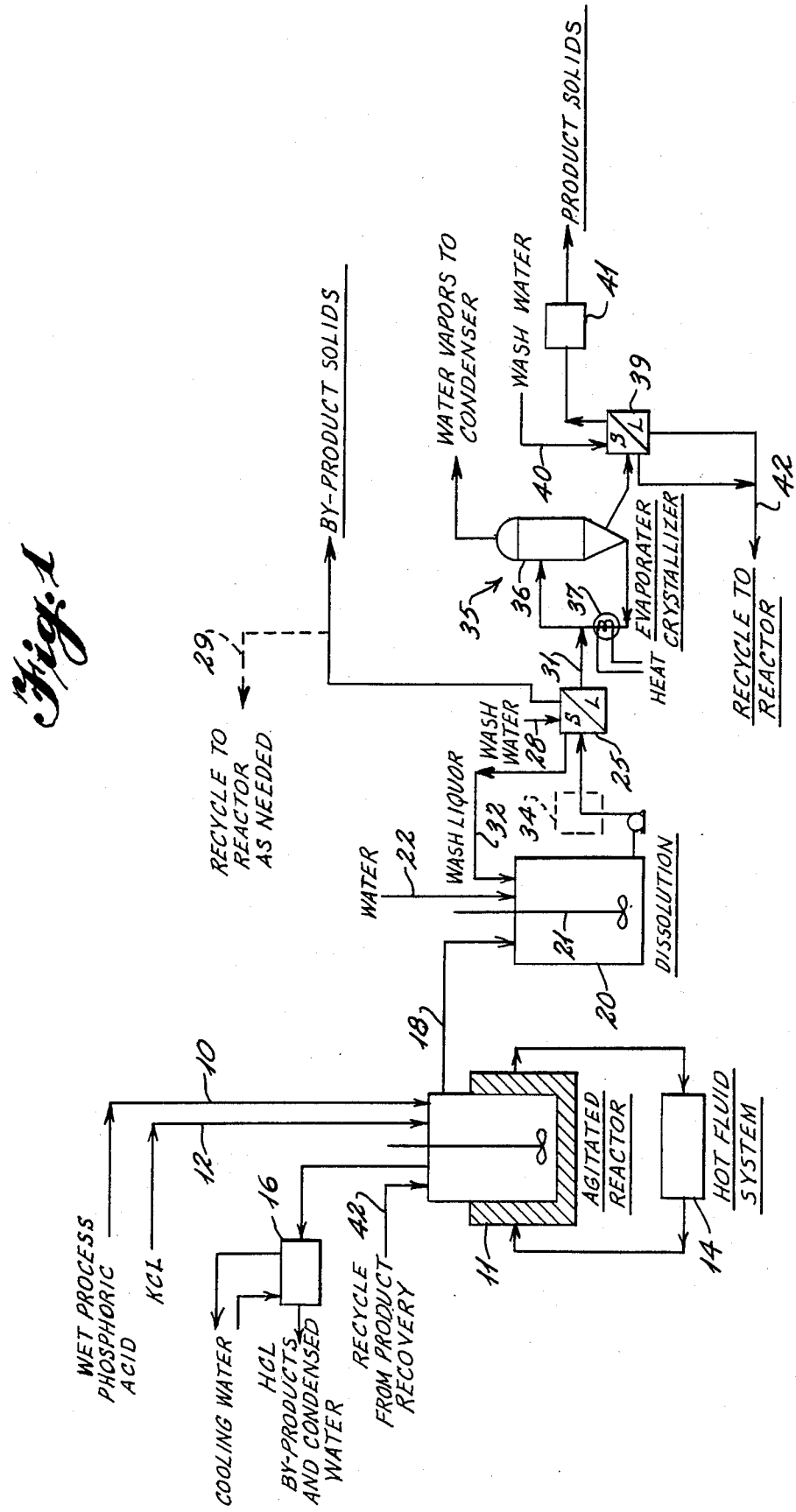
FIG. 1 is a diagrammatic flow chart of a one step product recovery system incorporated with the process of the present invention.

With specific reference to FIG. 1 of the drawings, a diagrammatic flow chart is disclosed showing a basic application of the invention. In this process, clarified 52–54% wet process phosphoric acid, merchant grade acid, or superacid is fed through line 10 to a heated reactor 11 along with potassium chloride which is introduced through line 12. The phosphoric acid is generally added in a ratio of approximately 2 to 1, by weight, with respect to the potassium chloride. During normal processing, there will also be added to the reactor 11 wet solids which are recycled from the downstream product recovery section as will be discussed in greater detail hereinafter. The recycled wet solids are introduced through line 29. The reactor 11 is heated in any conventional manner and as shown in the diagram of FIG. 1 is provided with a hot fluid circulation system 14.

The reactor 11 is further provided with an agitator or mixer 15 which is powered by a conventional motor source not shown. The agitator 15 is provided so as to adequately mix the solids within the reactor and to sufficiently expose the entire melt mass to the liquid surface to optimize the removal of hydrochloric gases and water vapors. Although the reactor is shown in the diagram as including a single holding tank or reactor, two or more reactors may be provided in series with the reactants being added in any combination at any stage. The recycled materials could be brought in with their associated water. It is preferred, however, that one reactor be provided in which all reactants are fed with the water associated with the recycled materials being essentially removed prior to feeding the solids to the reactor. The process of the present invention may be operated as a continuous or batch system.

The optimum temperature for the reaction of the process of the present invention is in the range of 180° C.–280° C. At temperatures much above these temperatures, the reaction mass can become a solid due to the formation of polyphosphates. At temperatures much below 200° C., the reaction rate and evolution of gases is slowed and the process becomes inefficient. The removal of hydrochloric gases is achieved by bringing the reaction materials as close to liquid surface to the greatest degree possible by use of the agitator 15. While the reactants can be mixed in a non-heated vessel and fed to a device such as a heated falling film evaporator or wiped film evaporator, practical considerations indicate a preferred single reactor vessel adequately agitated to allow hydrochloric gases to be exposed to the liquid surface to allow a reasonable withdrawal rate of the off gases.

The system also includes a hydrochloric acid recovery system 16 which accepts the hydrochloric gases and water vapor from the reactor 11 and cools them to cause condensation of the water. The condensed water in turn absorbs the hydrochloric gases to form a solution of hydrochloric acid. This process can be arranged in stages to provide various grades of hydrochloric acid solution or anhydrous HCl as marketable by-products.

The solutions entering the reactor 11 contain water which must be evaporated off. In the one reactor system shown in the drawings, if operated continuously, the volume must be such that the quantity of water is relatively small in order to avoid lowering the temperature of the reaction melt as the water boils off. If the operation is a batch operation, the temperature will rise as the water depletes until the water is totally removed. At this point, the temperature will rise until it is in balance with the melt composition and input heat flux. Thus, the heat input must be controlled to avoid excessive temperatures after the water has been removed.

The resultant melt from reactor 11 flows through line 18 to a dissolution vessel 20 which is provided with a mixer 21 that is powered by a conventional motor not shown. Water is added through line 22 to the melt within the vessel 20. The organics in the wet process acid are essentially oxidized in the reactor 11. However, metal impurities in the wet process phosphoric acid form insoluble compounds within the reactor 11. Thus, a slurry is formed of insoluble impurities in a solution containing the desired product MKP, potassium sulfate, unreacted potassium chloride, unreacted phosphoric acid, and possibly, a double salt of phosphoric acid and MKP.

The reaction melt in vessel 20 is dissolved to approximately 90% of saturation relative to MKP. This will have to be varied according to the actual solution composition, however, it is desirable to minimize the water evaporated in the downstream product recovery system. The slurry can be treated in a number of manners to remove the insoluble impurities such as by settling, centrifugation or filtration. As shown in FIG. 1, a filter unit 25 is provided downstream of vessel 20 and receives the slurry through line 26 which may be provided with a pump unit 27. During filtration, wash water is supplied through line 28. If there is a significant amount of double salt or other valuable components present in the insoluble solids separated within the filter unit 25, a portion of the solids may be recycled back to the reactor through line 29. If the double salt is not significant, the total solids are exported from the system as a possible by-product through line 30.

As the solids are separated from solution within the filtration unit 25 and washed, the mother liquid is conveyed to the downstream product recovery units through line 31. The wash liquor from the filtration unit 25 is conducted through line 32 into vessel 20.

Depending upon the nature of the solids, it may be desirable in some instances to include a settling tank 34 as shown in dotted line in FIG. 1 intermediate the vessel 20 and the filtration unit 25. The settler would be provided in order to concentrate solids prior to final separation from solution. This would reduce the quantity of liquid required to be handled by the final separation units. Also, where a simple device such as filter or centrifuge cannot effectively remove the solids and allow them to be washed off or in those instances where the input of water to the process must be kept to a minimum, the solids can be washed through the use of a countercurrent decantation system.

The filtered pregnant mother liquor is fed through line 31 to a product recovery section generally designated at 35. The product recovery section includes an evaporative crystallizer 36 which is provided with a source of heat through exchanger 37. As opposed to utilizing the evaporative crystallization unit shown in FIG. 1, a cooled crystallizer system may also be utilized and is shown in the system incorporated in FIG. 2 of the drawings. In the crystallizer, the water is evaporated and forwarded to a downstream condenser through line 38 and the wet solids are conveyed to filtration unit 39 wherein the wet solids are washed with water introduced through line 40. The wet solids MKP are removed from the filtration unit and are passed to a downstream dryer 41 and from there to a bagging or storage are not shown. The mother liquor from the filtration unit 39 which may contain minor amounts of MKP, potassium sulfates and potassium chloride and in some cases double salts is recycled back to the reactor 11 through line 42.

Figure 2:
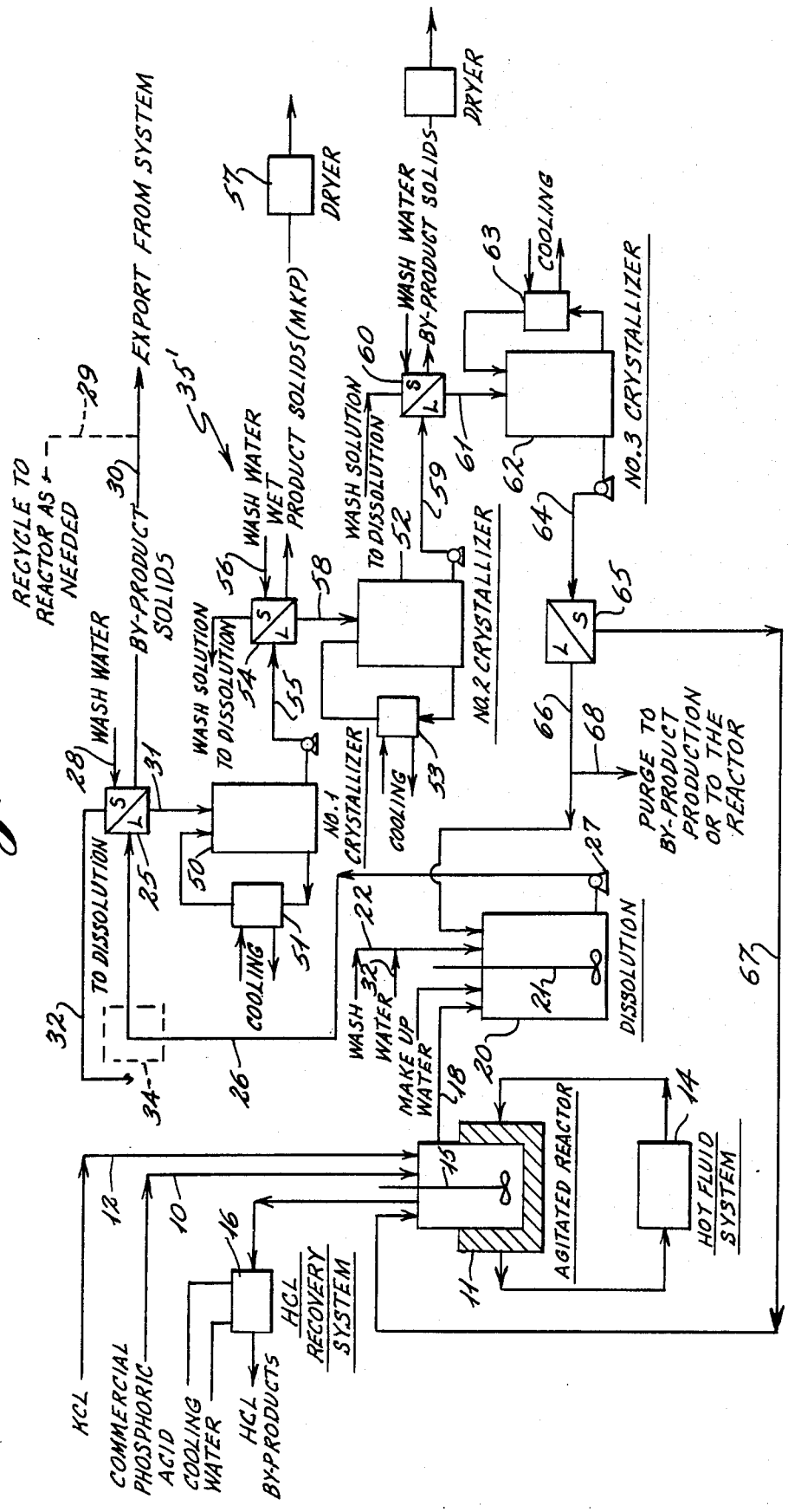
FIG. 2 is a diagrammatic flow chart of a multi-stage product recovery process in accordance with the teachings of the present invention.

With reference to FIG. 2 of the drawings, an alternative processing system of the present invention is disclosed in greater detail. In the system disclosed in incorporating a plurality of cooled crystallizers which are utilized to not only separate the relatively pure MKP in an initial step but also to recover potassium sulfate in a secondary process step. The third cooled crystallizer is provided in order to precipitate out any remaining MKP, potassium sulfates, potassium chlorides and double salts which are thereafter returned to the initial reactor.

In the operation of the system shown in FIG. 2 of the drawings, the wet process phosphoric acid and potassium chloride are introduced into the same reactor 11 as described with respect to FIG. 1. The remaining processing continues as described with respect to the process of FIG. 1 until the impurities are removed as insoluble components from the mother liquor which is conveyed to the product separation system 35' through line 31. In this process, the pregnant mother liquor is conveyed from filtration unit 25 into a first cooling crystallizer 50 having a cooling unit 51 associated therewith. The mother liquor is circulated and cooled allowing the desired pure MKP product to precipitate from the slurry. A fixed temperature is maintained which is set to produce the quality of the MKP product desired. If pure MKP is desired, the solution is cooled to a temperature just above the point where the next component would be precipitated out of solution. If pure MKP is not required, any potassium sulfate can be removed along with the product MKP by adjusting the temperature at which precipitation occurs within crystallizer 50. In such event, only a single crystallizer need be utilized as was the case in the processing system described with respect to FIG. 1. If, however, it is desired to recover potassium sulfate separately from the slurry, a second cooling associated cooling unit 53. The cooled slurry from crystallizer unit 50 is conveyed to a filtration or other separator unit 54 through line 55. The desired MKP solids are removed from solution with wash water being added through line 56. The removed MKP is thereafter passed to a dryer unit 57 and from there to a storage, bagging or other processing area as may be desired. The remaining liquor is discharged from the filtration unit 54 and enters through line 58 into the second stage crystallizer 52.

The temperature within the second crystallizer is maintained so as to further cool the slurry and precipitate out potassium sulfate along with some amounts of MKP. The slurry is passed through line 59 to a separation or filtration unit 60 wherein the potassium sulfate and MKP are removed as wet solids and may be thereafter dried and further processed. The remaining liquor passes through line 61 to a third stage cooling crystallizer 62 which includes an incorporated cooling unit 63.

In the final or third stage cooling, the temperature is reduced to a point which is sufficient to precipitate out a significant amount of the remaining MKP, potassium sulfate, potassium chloride, and if present, the double salt $H_3PO_4 \cdot KH_2PO_4$. The slurry is passed from the crystallizer 62 through lines 64 to a filtration or separation unit 65 wherein the precipitated solids are removed from the liquid with the liquid being passed or returned to the vessel 20 through lines 66. The wet solids are conveyed through line 67 back to the reactor 11.

With the foregoing process, the unreacted phosphoric acid is not recovered. Several methods could be used to deal with this acid. The acid may be simply purged from the system through the removal of a side stream from the process through line 68 The purge stream could be utilized to produce a by-product, for example, by treating the purge stream with ammonia to form an N-P-K fertilizer. Alternatively, the acid could be reacted with suitable calcium compounds to precipitate out dicalcium phosphate. This material could be used as a valuable by-product or treated with sulfuric acid to create phosphoric acid for recycle to the reactor 11.

As another option, the third stage cooling crystallizer may be replaced with an evaporative crystallizer with the concentrated solution being returned to the reactor 11. The evaporated water could be recovered by exchanging heat with the incoming wet process phosphoric acid thus minimizing heat consumption.

A preferred method for handling the phosphoric acid is to allow the concentration to build up in the recycle water stream until a small bleed stream may be recycled back to the reactor to balance the amount of unreacted phosphoric acid arriving at the melt dissolution step in vessel 20. The quantity of water associated with this bleed stream will be significantly lower than if the entire system is recycled. The higher acid level in the recycling water will not adversely effect the recovery of MKP. The bleed stream could be bled from the system rather than recycled to the reactor 11. The quantity of water to be dealt with in the bleed stream would be reduced. In this manner, if a dry N-P-K by-product fertilizer is desired, there would be less water to evaporate.

Although the system of FIG. 2 has been described utilizing separation or filtration units 54 and 60, it should be noted that these units may and are preferably centrifuges which receive the slurry from the precipitation stage in the crystallizer units and separate the solids from the spent mother liquor in order to obtain the products desired. Further, in each case, the wash liquor being introduced into each of the separation units is recycled to the melt dissolution stage in vessel 20.

In either of the embodiments of FIGS. 1 or 2, the wet product solids are transferred to dryers which may be rotary or fluid bed type dryers. The off gases from the dryers are equipped with dust recovery systems for capture and return of product dust to the melt dissolution tank 20. The dust recovery system may be any acceptable type including wet scrubbers or a dry type dust collector.

The dry products may be transferred to storage for bulk or bag shipment for further processing into product forms. One such arrangement can be the further purification by redissolving and recrystallization. This can further be improved by treating of the solution with an appropriate method for removal of some impurities such as by ion exchange prior to recrystallization. Other options include granulating the crystalline product to melt and prill it or to compact it.

The following examples will further demonstrate the process of the present invention. The initial work was conducted in a simple fashion with the goal of only determining if the concepts would work sufficiently to produce crystalline MKP from potassium chloride and a contaminated phosphoric acid product from the commercial wet process. The material produced was analyzed and was observed under microscope to determine that the crystalline MKP was produced.

EXAMPLE 1

Several tests were run which constituted only one cycle, starting with clarified 52-54% phosphoric acid produced commercially by the wet process and a refined KCl feed. In one such test, 995 grams of acid with 52.46% $P_2O_5$ was added to 550 grams of dry KCl and heated to 150° C. until essentially all of the water was gone. The temperature was then allowed to steadily increase to approximately 265° C., where it was held for 8 hours. The melt was then removed from the heat and mixed with 1,000 grams of water and agitated. A precipitate was formed in the water solution of MKP plus unreacted KCl and acid.

The solids were filtered out and washed, with the wash solution being returned to the initial filtrate. The resulting solution was evaporated at atmospheric pressure and allowed to cool. The resulting solid crystals were filtered out. The wet crystals were dried and analyzed. The mother liquor was also analyzed. The equivalent mother liquor associated with the crystals was back calculated and subtracted from the analysis of the crystals to determine the true composition of the crystals.

The analyses showed the crystalline product to contain MKP, potassium chloride and double salt. Microscopic observations confirmed these findings.

The specific results of a test are shown in Table 1.

TABLE 1

|  | % | | |
| --- | --- | --- | --- |
|  | $P_2O_5$ | K | Cl |
| Acid In | 52.46 | — | — |
| KCl In | — | 52.30 | 47.70 |
| Dissolution Water | — | — | — |
| Pregnant Mother Liquor | 9.20 | 6.20 | 1.90 |
| Solids (washed/dried) | 56.70 | 23.40 | 3.20 |
| Total Wash Liquor | 3.30 | 1.90 | 0.30 |
| Evaporated Solution | 12.80 | 8.10 | 2.10 |
| Dried Crystals* | 50.20 | 28.80 | 0.40 |
| Barren Mother Liquor | 11.20 | 7.60 | 4.60 |

*Free of Mother Liquor

Another test yielded the reject solids shown in Table 2.

TABLE 2

|  | % | | | |
| --- | --- | --- | --- | --- |
|  | $P_2O_5$ | K | Cl | $SO_4$ |
| Solids Cake (Washed/Dried) | 54.00 | 13.30 | 0.51 | 0.57 |

EXAMPLE 2

A test was conducted in which three batch cycles were run, with the barren mother liquor from each cycle being returned as part of the reactants for the next cycle. The recycle mother liquor for the first batch was derived from an earlier test. The intent of the test was to confirm that the system would continue to produce crystalline MKP through multiple cycles There was some concern that the system would eventually reach equilibrium with conditions that would not allow pure crystalline MKP to precipitate out of the pregnant mother liquor.

TABLE 3

|  | Total grams | MKP grams | Percent by Weight | | | |
| --- | --- | --- | --- | --- | --- | --- |
|  |  |  | $P_2O_5$ | K | Cl | $SO_4$ |
| CYCLE 1 | | | | | | |
| Phos Acid In | 1150 | — | 52.46 | — | — | — |
| KCl In | 586 | — | — | 51.70 | 45.60 | — |
| Solids (Washed/Dried) Out | 310 | — | 56.10 | 27.70 | 3.20 | 0.33 |
| Dry Crystals Out (1) | 624 | 420 | 44.55 | 27.60 | 2.60 | 6.80 |
| Barren Mother Liquor Out | 1020 | — | 19.80 | 10.70 | 5.60 | 1.60 |
| CYCLE 2 | | | | | | |
| Phos Acid In | 1150 | — | 52.46 | — | — | — |
| KCl In | 586 | — | — | 51.70 | 45.60 | — |

TABLE 3-continued

|  | Total grams | MKP grams | P₂O₅ | K | Cl | SO₄ |
|---|---|---|---|---|---|---|
| Solids (Washed/Dried) Out | 108 | — | 44.00 | 12.00 | 0.05 | 1.11 |
| Dry Crystals Out (1) | 1112 | 883 | 49.40 | 26.10 | 1.90 | 1.70 |
| Barren Mother Liquor Out | 1817 | — | 19.90 | 10.20 | 5.00 | 1.70 |
| CYCLE 3 | | | | | | |
| Phos Acid In | 1150 | — | 52.46 | — | — | — |
| KCl In | 586 | — | — | 51.70 | 45.60 | — |
| Solids (Washed/Dried) Out | 245 | — | 48.60 | 20.80 | 2.20 | 0.04 |
| Dry Crystals Out (1) | 626 | 428 | 46.80 | 26.10 | 2.20 | 5.30 |
| Barren Mother Liquor Out | 1070 | — | 14.80 | 8.20 | 3.00 | 1.90 |

(1) Free of Mother Liquor

EXAMPLE 3

Another series of tests were conducted in which four cycles were run. The initial cycles were started with a synthetic barren mother liquor. The analysis of this mother liquor, shown in Table 4, was chosen based on the results from the earlier work.

For this series of tests, the equipment was improved to afford better control of reaction temperature. The procedures were also modified slightly to allow faster progress in performing the cycles. Essentially, the concentrations of the solutions were determined by specific gravity during the test, with analysis following later. In the earlier tests, each step waited on the availability of the analysis from the previous cycle. This accounted for some of the variations in data.

The results are shown in Table 4 and FIG. 2.

TABLE 4

|  | Total grams | P₂O₅ | K | Cl | SO₄ |
|---|---|---|---|---|---|
| CYCLE 1 | | | | | |
| Phos Acid In | 1150.00 | 50.60 | — | — | 3.32 |
| KCl In | 586.00 | — | 51.70 | 45.60 | — |
| Barren Mother Liquor In (1) | 2157.00 | 30.70 | 14.40 | 6.00 | — |
| Solids (Washed/Dried) Out | 149.70 | 30.96 | 9.11 | 0.38 | 0.60 |
| Dry Crystals Out (2) | 701.20 | 49.36 | 29.15 | 0.23 | 1.03 |
| Barren Mother Liquor Out | 1695.70 | 21.11 | 12.03 | 5.61 | 0.93 |
| CYCLE 2 | | | | | |
| Phos Acid In | 1150.00 | 50.60 | — | — | 3.32 |
| KCl In | 586.00 | — | 51.70 | 45.60 | — |
| Barren Mother Liquor In | 1522.70 | 21.11 | 12.03 | 5.61 | 0.93 |
| Solids (Washed/Dried) Out | 130.40 | 41.48 | 12.07 | 0.03 | 0.22 |
| Dry Crystals Out (2) | 606.50 | 48.70 | 27.23 | 2.35 | 2.02 |
| Barren Mother Liquor Out | 1399.20 | 19.21 | 11.28 | 5.08 | 1.58 |
| CYCLE 3 | | | | | |
| Phos Acid In | 1150.00 | 50.60 | — | — | 3.32 |
| KCl In | 586.00 | — | 51.70 | 45.60 | — |
| Barren Mother Liquor In | 1290.80 | 19.21 | 11.78 | 5.08 | 1.58 |
| Solids (Washed/Dried) Out | 120.62 | 47.62 | 12.01 | 0.00 | 0.38 |
| Dry Crystals Out (2) | 846.86 | 48.32 | 27.25 | 2.08 | 2.69 |
| Barren Mother Liquor Out | 1252.00 | 18.91 | 10.56 | 4.21 | 1.04 |
| CYCLE 4 | | | | | |
| Phos Acid In | 1150.00 | 50.60 | — | — | 3.32 |
| KCl In | 586.00 | — | 51.70 | 45.60 | — |
| Barren Mother Liquor In | 1174.20 | 18.91 | 10.56 | 4.21 | 1.04 |
| Solids (Washed/Dried) Out | 121.57 | 47.62 | 12.01 | 0.36 | 0.70 |
| Dry Crystals Out (2) | 545.35 | 50.82 | 28.07 | 0.00 | 1.71 |
| Barren Mother Liquor Out | 1050.10 | 22.53 | 11.26 | 3.36 | 2.47 |

(1) Synthetic Barren Mother Liquor
(2) Free of Mother Liquor

We claim:

1. A process of producing monopotassium phosphate having a low chloride content from potassium chloride and wet process phosphoric acid comprising the steps of:
   a. Combining 52-54% phosphoric acid with potassium chloride in a reactor to form a mixture;
   b. Supplying heat to the mixture so as to drive off HCl and form a slurry including insoluble metallic impurity compounds, monopotassium phosphate, unreacted potassium chloride and unreacted phosphoric acid;
   c. Dissolving the slurry in a dissolution tank;
   d. Separating the insoluble metallic impurity compounds from the slurry and recovering a pregnant mother liquor containing monopotassium phosphates, unreacted potassium chlorides and unreacted phosphoric acid;
   e. Precipitating the monopotassium phosphate from the pregnant mother liquor to form a barren mother liquor and recovering the monopotassium phosphate.

2. The process of claim 1 including the additional step of recycling a portion of the barren mother liquor to the reactor.

3. The process of claim 2 in which the mixture is heated within the reactor at temperatures of approximately 265° C. to form said slurry.

4. The process of claim 3 in which the slurry is dissolved with water in the dissolution zone to approximately 90% of saturation relative to monopotassium phosphate.

5. The process of claim 1 in which the slurry is retained in the reactor for a period of time of approximately eight hours with the temperature being retained at approximately 265° C.

6. The process of claim 1 in which the phosphoric acid and potassium chloride are added to the reactor in a molar ratio of 1.00 to 1.40, respectively.

7. The process of claim 1 in which the monopotassium phosphate is precipitated out of the pregnant mother liquor by cooling the mother liquid in a cooler crystallizer to a temperature sufficient to precipitate the monopotassium phosphate without precipitating other products which would precipitate at temperatures below the temperature for precipitation of the monopotassium phosphate.

8. The process of claim 1 in which the monopotassium phosphate is precipitated in an evaporative crystallizer wherein heat is supplied to the mother liquor to separate water vapors and condense the mother liquor and thereafter separating the precipitate monopotassium phosphate from the mother liquor.

9. The process of claim 1 in which said slurry includes potassium sulfate, the potassium sulfate being present in the barren mother liquor, and precipitating the potassium sulfate from the barren mother liquor and recovering the potassium sulfate.

10. The process of claim 9 including the additional step of treating the remaining mother liquor so as to precipitate out additional materials including monopotassium phosphate, potassium sulfate, potassium chloride and double salt and recycling at least a portion of said materials to the reactor.

11. A process of producing monopotassium phosphate having a low chloride content from potassium chloride and 52-54% wet process phosphoric acid comprising the steps of:
   a. Combining the phosphoric acid with potassium chloride in a reactor to form a mixture;

b. Continuously mixing and supplying heat to the mixture within the reactor so as to drive off HCl and form a slurry including insoluble metal impurity compounds, monopotassium phosphate, potassium sulfate, unreacted potassium chloride and unreacted sulfuric acid;

c. Dissolving the slurry in a dissolution tank wherein water is added to bring the solution to a point relatively near saturation relative to monopotassium phosphate;

d. Separating the insoluble metallic impurity compounds from the solution and recovering the insoluble impurities and forming a pregnant mother liquor containing monopotassium phosphates, potassium sulfates, unreacted potassium chlorides and unreacted phosphoric acid;

e. Introducing the pregnant mother liquor into a first cooler crystallizer and reducing the temperature of the mother liquor to a temperature which will precipitate monopotassium phosphate without precipitating the potassium sulfates in the mother liquor;

f. Separating the monopotassium phosphate from the mother liquor;

g. Subsequently introducing the mother liquor into a second cooler crystallizer and reducing the temperature of the mother liquor slurry to a temperature at which potassium sulfates are precipitated;

h. Separating the potassium sulfates from the mother liquor to form a barren mother liquor; and i. Recycling at least a portion of the barren mother liquor to the dissolution tank.

12. The process of claim 11 including the additional step of cooling the barren mother liquor after the second cooler crystallizer stage in a third cooler crystallizer so as to further precipitate materials including remaining monopotassium phosphate, potassium sulfate, potassium chloride and double salts present and separating these precipitated materials and recycling at least a portion of these materials to the reactor.

13. The process of claim 12 including the additional step of forming a bleed stream from the barren mother liquor being returned to the dissolution tank so as to remove phosphoric acid to control the amount of phosphoric acid being recycled through the dissolution tank.

14. The process of claim 11 wherein the separated insoluble metallic impurity compounds are washed to form by-product solids and a washed liquor, and recycling at least a portion of the washed liquor to the dissolution tank.

15. The process of claim 11 in which the reactor temperature is maintained at a temperature of approximately 265° C.

16. The process of claim 15 in which the phosphoric acid and potassium chloride are added to the reactor in amounts by weight of substantially equal to the ratio of 2 to 1, respectively.

17. A method of producing monopotassium phosphate having low chloride content from potassium chloride and commercial wet process phosphoric acid having impurity elements contained therein comprising the steps of mixing the wet phosphoric acid with the potassium chloride in a reaction vessel, heating the mixture so as to form a slurry and elevating the temperatures to approximately 265° C. to drive off HCl gases and form insoluble compounds from the elements contained in the wet process phosphoric acid, dissolving the slurry and separating out the insoluble compounds from the slurry to form by-products and a pregnant mother liquor, and subsequently treating the pregnant mother liquor in order to precipitate out and remove substantially pure monopotassium phosphate and thereby creating a barren mother liquor.

18. The process of claim 17 including returning at least a portion of the barren mother liquor to the slurry in the dissolution step.

19. The process of claim 18 in which the phosphoric acid and potassium chloride are mixed in a ratio by weight of approximately 2:1.

* * * * *